US009151946B2

(12) United States Patent
Sung et al.

(10) Patent No.: US 9,151,946 B2
(45) Date of Patent: Oct. 6, 2015

(54) METHOD OF MANUFACTURING PIXEL WALLS OF AN ELECTROWETTING DISPLAY DEVICE

(71) Applicant: SAMSUNG DISPLAY CO., LTD., Gyeonggi-do (KR)

(72) Inventors: Woo-Yong Sung, Seoul (KR); A-Ram Lee, Gyeonggi-do (KR); Tae-Gyun Kim, Seoul (KR); Tae-Woon Cha, Seoul (KR); Sang-Gun Choi, Gyeonggi-do (KR)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 13/684,268

(22) Filed: Nov. 23, 2012

(65) Prior Publication Data

US 2013/0335804 A1 Dec. 19, 2013

(30) Foreign Application Priority Data

Jun. 14, 2012 (KR) .......................... 10-2012-0063854

(51) Int. Cl.
*G02B 26/00* (2006.01)

(52) U.S. Cl.
CPC .................................... *G02B 26/005* (2013.01)

(58) Field of Classification Search
CPC .............................. G02F 1/167; G02F 1/1678
USPC ................. 359/290–298, 228, 245, 253, 665; 429/209, 246; 345/32, 41, 48, 107; 216/24

See application file for complete search history.

(56) References Cited

U.S. PATENT DOCUMENTS

| 7,794,799 | B1 * | 9/2010 | Kim et al. ................... 427/532 |
| 7,821,699 | B1 * | 10/2010 | Lo et al. ...................... 359/290 |
| 7,847,996 | B2 | 12/2010 | Chen et al. |
| 2008/0055711 | A1 * | 3/2008 | Kolodner et al. ............ 359/296 |
| 2010/0033798 | A1 * | 2/2010 | Wang et al. .................. 359/290 |
| 2010/0225004 | A1 * | 9/2010 | Igarashi ........................ 257/774 |

FOREIGN PATENT DOCUMENTS

KR 1020110074087 A 6/2011

* cited by examiner

*Primary Examiner* — Scott J Sugarman
*Assistant Examiner* — Tamara Y Washington
(74) *Attorney, Agent, or Firm* — Lee & Hayes, PLLC (57) ABSTRACT

A method of manufacturing an electrowetting display device includes a preliminary partition wall pattern formed on a lower substrate on which a pixel electrode of an oxide series and an insulation layer are formed. The preliminary partition wall pattern is disposed along a boundary of the pixel electrode. A water-repellent layer including a self-assembled monolayer having a hydrophobic property is formed on the lower substrate. A portion of the preliminary partition wall pattern and the water-repellent layer formed on the preliminary partition wall pattern are removed to form a partition wall pattern on the insulation layer and to form a water-repellent pattern on the pixel electrode and the insulation layer between partition walls of the partition wall patterns. A fluid layer is formed on the lower substrate on which the water-repellent pattern is formed. The lower substrate and an upper substrate are combined with each other.

20 Claims, 9 Drawing Sheets

METHOD OF MANUFACTURING PIXEL WALLS OF AN ELECTROWETTING DISPLAY DEVICE

CROSS-REFERENCE TO RELATED APPLICATION

This application claims priority to Korean Patent Application No. 10-2012-0063854, filed on Jun. 14, 2012, the content of which is herein incorporated by reference in its entirety.

TECHNICAL FIELD

Exemplary embodiments of the present invention relate to an electrowetting display, and more particularly, to an electrowetting display device and a method of manufacturing the electrowetting display device.

DISCUSSION OF THE RELATED ART

An electrowetting display includes a water-repellent layer, a partition wall pattern and a fluid layer. The fluid layer includes an oil and an electrolyte. When no voltage is applied to the electrolyte, the oil remains dispersed on the water-repellent layer, and when a voltage is applied to the electrolyte, the electrolyte is pulled toward the water-repellent layer and the oil is forced to move to the partition wall pattern. In this way, the electrowetting display displays images.

When a partition wall pattern is formed on a water-repellent layer having a hydrophobic property, the partition wall pattern may be easily stripped off the water-repellent layer.

SUMMARY

According to an embodiment of the present invention, an electrowetting display device includes an insulation layer, a pixel electrode, a partition wall pattern, a water-repellent pattern, a fluid layer and an upper substrate. The insulation layer is formed on a lower substrate. The pixel electrode is formed of an oxide on the insulation layer. The partition wall pattern is disposed along an edge portion of the pixel electrode. The water-repellent pattern is disposed on the pixel electrode and the insulation layer between partition walls of the partition wall pattern. The fluid layer is disposed on the water-repellent pattern. The upper substrate is combined with the lower substrate on which the insulation layer, the pixel electrode, the partition wall pattern, the water-repellent pattern and the fluid layer are formed.

In an exemplary embodiment of the present invention, the partition wall pattern may include a lower portion and an upper portion narrower than the lower portion. A height of the lower portion of the partition wall pattern may be substantially equal to a height of the water-repellent pattern.

In an exemplary embodiment of the present invention, an end portion of the partition wall pattern may have a rounded shape when viewed from a cross-sectional view.

In an exemplary embodiment of the present invention, the partition wall pattern may include a photosensitive polymer having a hydrophilic property with respect to the water-repellent pattern.

In an exemplary embodiment of the present invention, the thickness of the water-repellent pattern may be about 5 Å to about 100 Å.

In an exemplary embodiment of the present invention, the water-repellent pattern may include a silane-based self-assembled monolayer.

According to an embodiment of the present invention, there is provided a method of manufacturing an electrowetting display device. In the method, a preliminary partition wall pattern is formed on a lower substrate on which a pixel electrode formed of an oxide and an insulation layer are formed. The preliminary partition wall pattern is disposed along a boundary of the pixel electrode. A water-repellent layer including a self-assembled monolayer having a hydrophobic property is formed on the lower substrate on which the preliminary partition wall pattern, the pixel electrodes and the insulation layer are formed. A portion of the preliminary partition wall pattern and the water-repellent layer formed on the preliminary partition wall pattern are removed forming a partition wall pattern on the insulating layer and forming a water-repellent pattern on the insulating layer and the pixel electrode between partition walls of the partition wall pattern. A fluid layer is formed on the lower substrate on which the water-repellent pattern is formed. The lower substrate and an upper substrate are combined with each other.

In an exemplary embodiment of the present invention, a photosensitive polymer having a hydrophilic property may be coated on the lower substrate on which a pixel electrode of an oxide series and an insulation layer are formed, and the preliminary partition wall pattern may be formed. Then, a portion of the photosensitive polymer may be exposed. Then, the photosensitive polymer may be developed exposing the pixel electrode and the insulation layer.

In an exemplary embodiment of the present invention, the self-assembled monolayer of the water-repellent layer may be a silane-based self-assembled monolayer.

In an exemplary embodiment of the present invention, the silane-based self-assembled monolayer may include perfluorodecyltrichlorosilane (FDTS), octadecyltrichlorosilane (OTS), perfluorooctyltrichlorosilane (FOTS) or octyltrimethoxysilane (OTMS).

In an exemplary embodiment of the present invention, the water-repellent layer may be formed by liquid or vapor phase deposition.

In an exemplary embodiment of the present invention, the water-repellent layer may have a thickness of about 5 Å to about 100 Å.

in an exemplary embodiment of the present invention, the portion of the preliminary partition wall pattern and the water-repellent layer may be removed through a wet etching process.

In an exemplary embodiment of the present invention, a wet etching solution used in the wet etching process may have an etching selection ratio with respect to the oxide-based pixel electrode and the insulation layer, and the wet-etching solution may selectively etch the preliminary partition wall pattern.

In an exemplary embodiment of the present invention, the surface energy of the partition wall pattern may be lower than the surface energy of the pixel electrode and the insulation layer.

In an exemplary embodiment of the present invention, the water-repellent layer may include a first water-repellent layer and a second water-repellent layer. The first water-repellent layer may be formed on the preliminary partition wall pattern. The second water-repellent layer may be formed on the pixel electrode and the insulation layer. In an embodiment, the first water-repellent layer may have pin holes and defects. The number of the pin holes and defects included in the first water-repellent layer is substantially greater than the number of pin holes and defects included in the second water-repellent layer.

In an exemplary embodiment of the present invention, a wet-etching solution may be infiltrated through the pin hole and the defects of the first water-repellent layer to remove the portion of the preliminary partition wall pattern, and the water-repellent pattern may be formed.

In an exemplary embodiment of the present invention, prior to forming the preliminary partition wall pattern, a protection layer may be formed of an oxide between the water-repellent pattern and the insulation layer.

In an exemplary embodiment of the present invention, the pixel electrode may include an oxide-based transparent electrode, and the insulation layer may include a silicon oxide.

According to an electrowetting display device and a method of manufacturing the electrowetting display device, a water-repellent pattern and a partition wall pattern may have a relatively high adhesive force. Thus, the water-repellent pattern and the partition wall pattern are not easily stripped from an insulation layer and a pixel electrode.

The water-repellent pattern is formed not on the bottom surface of the partition wall pattern but on an oxide-based material layer between partition walls of the partition wall pattern. The water-repellent pattern is formed to a uniform and thin thickness. Thus, the partition wall pattern may have hydrophilic properties. An adhesive force between oil filled in spaces defined by the partition wall pattern and the partition wall pattern is decreased, and the oil may be prevented from being moved to a neighbor pixel across the partition wall pattern. The water-repellent pattern is formed to a uniform thickness, and the contrast ratio may be easily controlled according to the move of the oil. Therefore, the electrowetting display device may have increased driving reliability.

BRIEF DESCRIPTION OF THE DRAWINGS

The embodiments of the present invention will be apparent by reference to the following description when considered in conjunction with the accompanying drawings, wherein:

FIG. 2A to FIG. 2E are cross-sectional views illustrating a method of manufacturing an electrowetting display device as shown in FIG. 1;

FIG. 4A to FIG. 4C are cross-sectional views illustrating a process of forming a partition wall pattern and a water-repellent pattern;

FIG. 6A to FIG. 6C are cross-sectional views illustrating a method of manufacturing a first substrate as shown in FIG. 5.

DETAILED DESCRIPTION OF THE ILLUSTRATED EMBODIMENTS

Hereinafter, embodiments of the present invention will be described in detail with reference to the accompanying drawings, wherein the same reference numerals may be used to denote the same or substantially the same elements throughout the specification and the drawings. As used herein, the singular forms, "a," "an" and $^{the}$ are intended to include the plural forms as well, unless the context clearly indicates otherwise. It will be understood that when an element or layer is referred to as being "on" another element or layer, it can be directly on the other element or layer or intervening elements or layers may be present.

Figure 1:
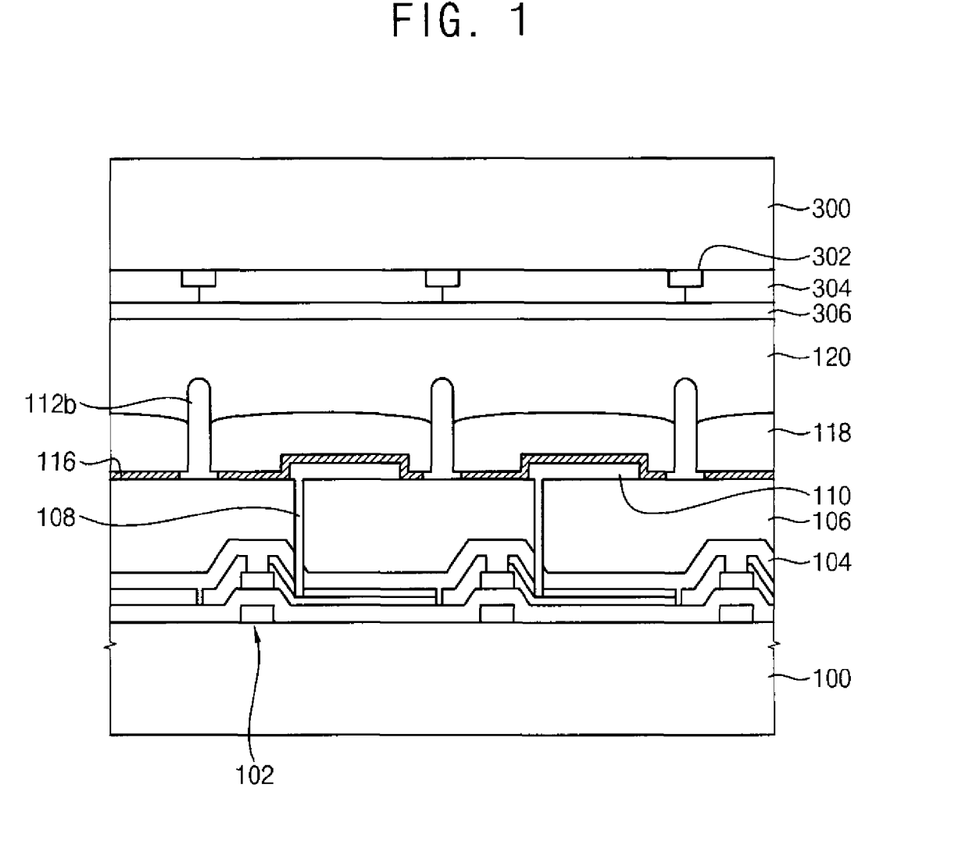
FIG. 1 is a cross-sectional view illustrating an electrowetting display device according to an exemplary embodiment of the present invention.

FIG. 1 is a cross-sectional view illustrating an electrowetting display device according to an exemplary embodiment of the present invention.

Referring to FIG. 1, the electrowetting display device includes a lower substrate 100, an upper substrate 300 and a fluid layer 118 and 120.

A thin-film transistor 102, a barrier layer 104, an insulation layer 106, a pixel electrode 110, a partition wall pattern 112b and a water-repellent pattern 116 are formed on the lower substrate 100.

According to an embodiment, the lower substrate 100 may be a glass substrate or a flexible substrate, such as a plastic substrate or a glass fiber reinforced plastic substrate. The lower substrate 100 includes a plurality of pixel areas. A pixel area may be defined by a gate line and a data line crossing the gate line. The thin-film transistor 102 may be disposed on a corresponding pixel area.

The barrier layer 104 covers the thin-film transistor 102 on the lower substrate 100. The insulation layer 106 may be disposed on the barrier layer 104. According to an embodiment, the insulation layer 106 may include a material, such as an oxide. For example, according to an embodiment, the barrier layer 104 may include silicon nitride, and the insulation layer 106 may include silicon oxide.

The pixel electrode 110 may be disposed on the insulation layer 106. The pixel electrode 110 may include a transparent electrode. For example, according to an embodiment, the pixel electrode 110 may include a material, such as indium tin oxide (ITO) or indium zinc oxide (IZO). A contact 108 contacting a drain electrode of the thin-film transistor 102 may be formed through the insulation layer 106 and the pixel electrode 110. The contact 108 electrically connects the pixel electrode 110 with the drain electrode of the thin-film transistor.

The partition wall pattern 112b includes a plurality of partition walls. The partition wall pattern 112b contacts an upper surface of the insulation layer 106. The partition wall pattern 112b is formed along a boundary of each pixel, thereby dividing the pixels. Opening portions each of which defines an inner space are formed by the partition wall pattern 112b, and the inner space of each opening portion corresponds to one pixel. According to an embodiment, when viewed from a plan view, the partition wall pattern 112b may have a matrix shape. The partition wall pattern 112b is not provided on bottom portions of the opening portions.

According to an embodiment, the partition wall pattern 112b may include a photosensitive polymer having a hydrophilic property that is substantially greater than a hydrophilic property of the water-repellent pattern 116. The surface energy of the partition wall pattern 112b may be lower than the surface energy of the insulation layer 106 and the pixel electrode 110.

A bottom portion of the partition wall pattern 112b may have a width larger than a side wall portion of the partition wall pattern 112b. A height of the bottom portion of the partition wall pattern 112b may be substantially equal to a height of the water-repellent pattern 116. For example, according to an embodiment, the partition wall pattern 112b may have a height of about 1 μm to about 8 μm. A height of the bottom portion of the partition wall pattern 112b may be about 5 Å to about 100 Å. According to an embodiment, when viewed from a cross-sectional view, an end portion of an upper surface of the partition wall pattern 112b may be rounded.

The water-repellent pattern 116 contacts the insulation layer 106 under the bottom surfaces of the opening portions between the partition walls of the partition wall pattern 112b and an upper surface of the pixel electrode 110. The water-repellent pattern 116 need not be disposed on an upper portion of the partition wall pattern 112b and a bottom surface of the partition wall pattern 112b. The water-repellent pattern 116 has a hydrophobic property that is substantially greater than a hydrophobic property of the partition wall pattern 112b.

According to an embodiment, the water-repellent pattern 116 may include a self-assembled monolayer (SAM) having a hydrophobic property. According to an embodiment, the self-assembled monolayer may include a material with an inner density that varies in accordance with the surface energy of a contact surface. For example, according to an embodiment, the self-assembled monolayer formed on the insulation layer and the pixel electrode having high surface energy has a relatively high inner density, and the self-assembled monolayer formed on a surface of the partition wall pattern 112b having low surface energy has a relatively low inner density. On an upper surface of the insulation layer 106 and the pixel electrode 110, the water-repellent pattern 116 may be formed of a self-assembled monolayer having a smaller number of pin holes and defects and having a high inner density. According to an embodiment, the self-assembled monolayer may include a material chemically combined with the insulation layer 106 formed of an oxide and the pixel electrode 110. For example, according to an embodiment, the self-assembled monolayer may be a silane-based self-assembled monolayer.

For example, according to an embodiment, a silane-based self-assembled precursor may be self-assembled forming the water-repellent pattern 116. The silane-based self-assembled precursor may be, e.g., perfluorodecyltrichlorosilane (FDTS), octadecyltrichlorosilane (OTS), perfluorooctyltrichlorosilane (FOTS), or octyltrimethoxysilane (OTMS).

According to an embodiment, the water-repellent pattern 116 is formed by a self-assembled monolayer, and the water-repellent pattern 116 may have the thickness of a molecule. For example, according to an embodiment, the water-repellent pattern may have a thickness of about 5 Å to about 100 Å. As the thickness of the water-repellent pattern 116 is reduced, the electrowetting display device may be driven at a relatively low voltage.

The water-repellent pattern 116 is chemically combined with the insulation layer 106 formed of an oxide and the pixel electrode 110. According to an embodiment, the thickness of the water-repellent pattern 116 may be uniform. For example, according to an embodiment, a thickness deviation of the water-repellent pattern 116 may be within about 10%.

The water-repellent pattern 116 formed in a fluorine coating or a Teflon coating. The water-repellent pattern 116 formed on a meniscus of the partition wall pattern 112b may be thicker than the water-repellent pattern 116 formed on a portion adjacent to the partition wall pattern 112b. However, the water-repellent pattern 116 according to an exemplary embodiment of the present invention may be formed to a uniform thickness.

In a conventional electrowetting display, a water-repellent pattern 116 may be disposed on a lower substrate 100, and a partition wall pattern 112b may be formed on the water-repellent pattern 116. The water-repellent pattern 116 formed on the lower substrate 100 is physically combined with the partition wall pattern 112b, and an adhesive force between the water-repellent pattern 116 and the partition wall pattern 112b is reduced. The water-repellent pattern 116 has relatively high hydrophobic property, and an adhesive force of the partition wall pattern 112b which contacts an upper surface of the water-repellent pattern 116 is reduced. Thus, the partition wall pattern 112b may be stripped off the water-repellent pattern 116. However, in an electrowetting display device according to an exemplary embodiment, the partition wall pattern 112b does not need to contact the water-repellent pattern 116 and contacts an oxide series insulation layer 106. Thus, an adhesive force of the partition wall pattern 112b is increased.

The water-repellent pattern 116 may include a material which has a relatively high coupling force with respect to the insulation layer 106 and the pixel electrode 110 and which has a relatively high inner density. Thus, the water-repellent pattern 116 is prevented from being stripped. The water-repellent pattern 116 need not be disposed on a surface of the partition wall pattern 112b. Thus, the surface of the partition wall pattern 112b has a hydrophilic property that is substantially greater than a hydrophilic property of the water-repellent pattern 116, and the oil pattern 118 may be prevented from flowing to adjacent pixels. An adhesive force of the electrolyte may be increased when the electrolyte covering the oil pattern 118 is coated.

The fluid layer 118 and 120 includes an oil pattern 118 disposed in an opening portion of the partition wall pattern 112b and an electrolyte layer 120 covering the lower substrate 100 on the oil pattern 118. The electrolyte layer 120 is disposed between the lower substrate 100 and the upper substrate 300.

The oil pattern 118 may be moved while contacting the water-repellent pattern 116 having relatively high hydrophobic property. Since an affinity between the oil pattern 118 and the water-repellent pattern 116 is substantially greater than an affinity between the oil pattern 118 and the partition wall pattern 112b, the oil pattern 118 may be stably disposed on the water-repellent pattern 116.

According to an embodiment, the electrolyte layer 120 may be ethylene glycol (EG). Since an affinity between the electrolyte layer 120 and a surface of the partition wall pattern 112b is relatively high, the electrolyte layer 120 may be stably disposed on the oil pattern 118.

A light-blocking pattern 302, a color filter layer 304 and a common electrode 306 are disposed on the upper substrate 300.

The light-blocking layer 302 is formed on the upper substrate 300 facing the partition wall pattern 112b. The color filter layer 304 includes plural color filters representing different colors. Each of the color filters is formed on the upper substrate 300 facing a corresponding pixel electrode 110. The common electrode 306 may be disposed on the color filter layer 304. According to an embodiment, an overcoating layer may be further formed between the color filter layer 304 and the common electrode 306.

The partition wall pattern 112b having a hydrophilic property contacts an upper surface of the insulation layer 106, and an adhesive force between the partition wall pattern 112b and the insulation layer 106 may be relatively high. The water-repellent pattern 116 is formed to a uniform thickness and has a relatively high adhesive force with the insulation layer 106 between the partition walls of the partition wall pattern 112b and the pixel electrode 110. Thus, the electrowetting display device may be driven at a relatively low voltage, and the reliability of the electrowetting display device may be increased.

FIG. 2A to FIG. 2E are cross-sectional views illustrating a method of manufacturing an electrowetting display device as shown in FIG. 1.

Figure 2A:
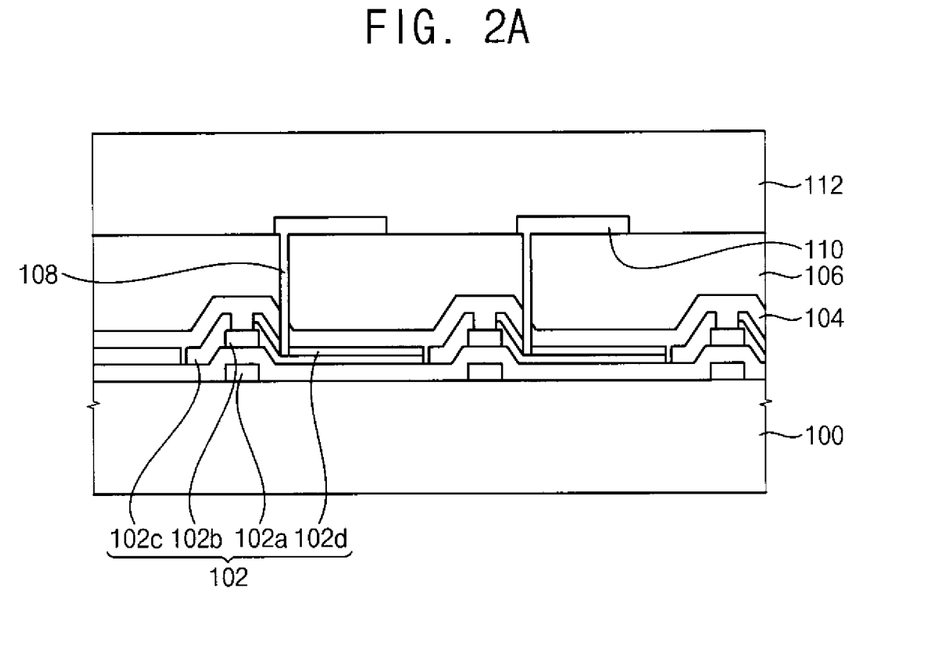

Referring to FIGS. 1 and 2A, the thin-film transistor 102, the barrier layer 104, the insulation layer 106 and the contact 108 are formed on the lower substrate 100. The thin-film transistor 102 may include a gate electrode 102a, a semiconductor layer 102b, a source electrode 102c and a drain electrode 102d. The contact 108 may contact the drain electrode 102d of the thin-film transistor 102.

A pixel electrode 110 contacting the contact 108 is formed on the insulation layer 106. According to an embodiment, a pixel electrode layer is formed and then patterned forming the pixel electrode 110.

According to an embodiment, the insulation layer 106 may include an insulation material, e.g., an oxide. According to an embodiment, the pixel electrode 110 may include a transparent electrode that is formed of an oxide. For example, according to an embodiment, the insulation layer 106 may include a silicon oxide. According to an embodiment, the pixel electrode 110 may include a material, such as indium tin oxide (ITO) or indium zinc oxide (IZO).

A partition wall layer 112 is coated on the insulation layer 106 and the pixel electrode 110. The partition wall layer 112 may be formed to a thickness of about 1 μm to about 8 μm. The partition wall layer 112 may be formed of a photosensitive polymer having a hydrophilic property. For example, according to an embodiment, the partition wall layer 112 may be formed by coating a photoresist material on the insulation layer 106 and the pixel electrode 110. The partition wall layer 112 need not be formed on the water-repellent layer. The partition wall layer 112 is coated on the insulation layer 106, which is formed of an oxide, and the pixel electrode 110. Thus, the partition wall layer 112 may have a relatively high adhesive force with respect to the insulation layer 106.

Figure 2B:
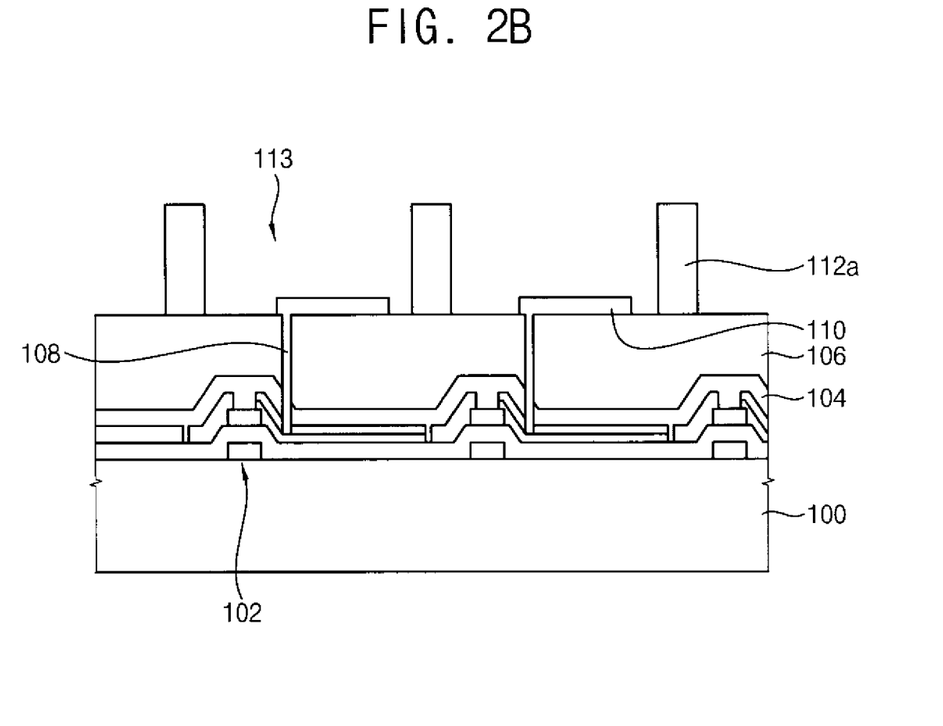

Referring to FIG. 2B, the partition wall layer 112 is patterned forming a preliminary partition wall pattern 112a having a matrix shape surrounding the pixel electrode 110 along an edge of the pixel electrode 110. The preliminary partition wall pattern 112a divides the pixel electrodes into each other. For example, opening portions 113 are generated by the preliminary partition wall pattern 112a, and each of the opening portions 113 corresponds to a pixel. According to an embodiment, an exposing process and a developing process may be performed, and the preliminary partition wall pattern 112a may be formed.

According to an embodiment, an oxide-based insulation layer 106 and a pixel electrode 110 are disposed below the partition wall layer 112. The oxide-based insulation layer 106 and the pixel electrode 110 need not be a photosensitive material, and properties of the oxide-based insulation layer 106 and the pixel electrode 110 need not be varied by the exposing process and the developing process. Thus, the partition wall layer 112 is sufficiently or excessively exposed and developed to be patterned into the preliminary partition wall pattern 112a. The partition wall layer 112 need not be left in an inner portion of the opening portion 113 after the exposing process and the developing process are performed. A residual process or a plasma process to additionally remove the remaining partition wall layer 112 need not be performed.

Since the partition wall layer 112 is formed prior to forming the water-repellent layer, the water-repellent layer need not be disposed on a bottom of the partition wall layer 112. Thus, even through the partition wall layer 112 is patterned by sufficient or excessive exposing and developing, the water-repellent layer is not damaged. The partition wall layer 112 need not be left on the water-repellent layer.

Figure 2C:
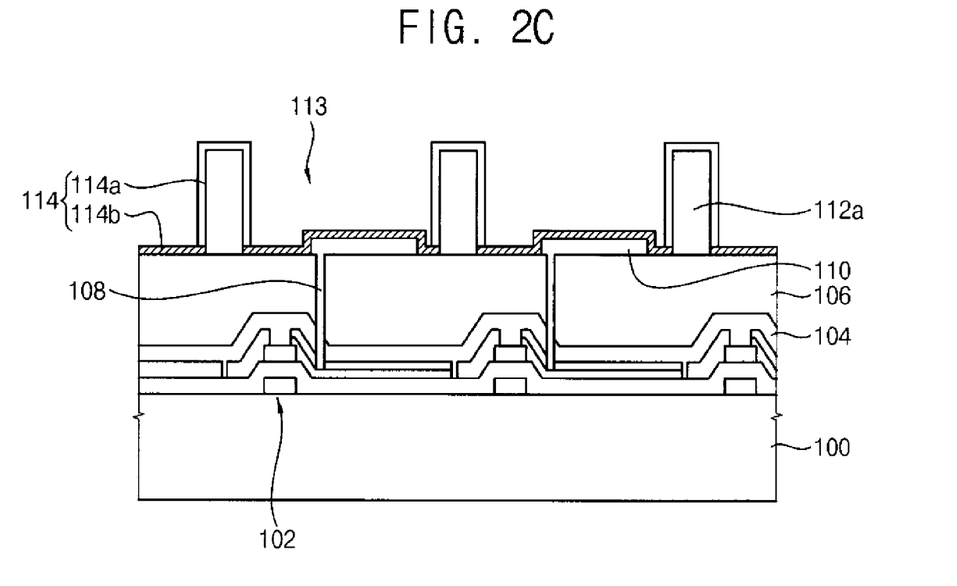

Referring to FIG. 2C, a water-repellent layer 114 is formed along a surface of the preliminary partition wall pattern 112a, the exposed insulation layer 106 and the pixel electrode 110.

The water-repellent layer 114 has a hydrophobic property that is substantially greater than a hydrophobic property of the preliminary partition wall pattern 112a.

According to an embodiment, the water-repellent layer 114 may include a self-assembled monolayer (SAM). The self-assembled monolayer may include a material with an inner density that is varied in accordance with the surface energy of a contact surface.

Figure 3A:
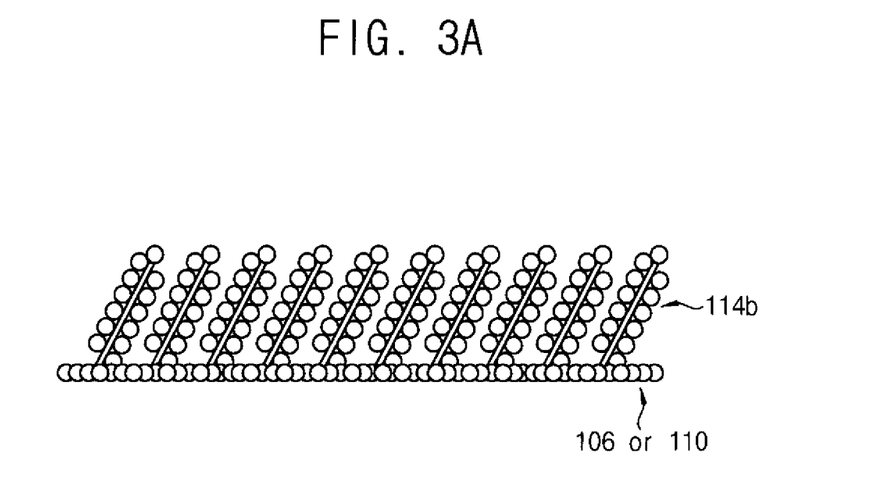
FIG. 3A and FIG. 3B each show the atom arrangement of a self-assembled monolayer formed on each of different contact surfaces.
Figure 3B:
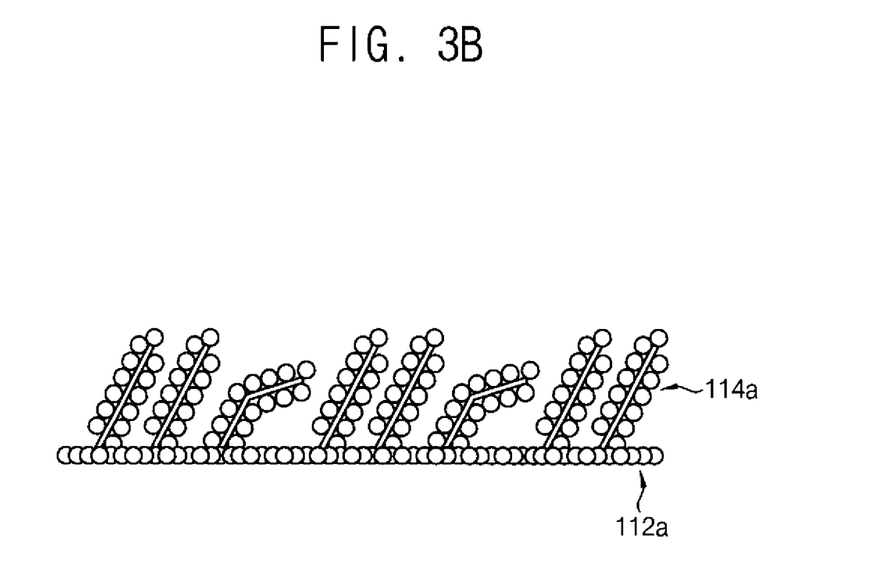

FIG. 3A and FIG. 3B each show the atom arrangement of a self-assembled monolayer formed on each of different contact surfaces.

As shown in FIG. 3A, a self-assembled monolayer 114b, which is formed on an upper surface of the insulation layer 106 having relatively high surface energy and the pixel electrode 110, has a relatively high inner density. Thus, no or a small number of pin holes or defects are generated through the self-assembled monolayer 114b.

As shown in FIG. 3B, a self-assembled monolayer 114a formed on an upper surface of the preliminary partition wall pattern 112a having relatively low surface energy may have a relatively low inner density. Thus, the number of pin holes or defects of the self-assembled monolayer 114a formed on the preliminary partition wall pattern 112a is substantially greater than the number of pin holes or defects of the self-assembled monolayer 114b formed on the insulation layer 106 and the pixel electrode 110.

According to an embodiment, the water-repellent layer 114 may include a first water-repellent layer 114a formed on a surface of the preliminary partition wall pattern 112a and a second water-repellent layer 114b formed on the insulation layer 106 and the pixel electrode 110. The first water-repellent layer 114a has a relatively great number of pin holes or defects and low density, and the second water-repellent layer 114b has a relatively small number of pin holes or defects and high density.

The self-assembled monolayer may include a material chemically combined with the insulation layer 106 and the pixel electrode 110. For example, according to an embodiment, the self-assembled monolayer may be a silane-based self-assembled monolayer. Thus, the water-repellent layer 114 is chemically combined with a surface of the insulation layer 106 and the pixel electrode 110, and the water-repellent layer 114 has a high coupling force with respect to the insulation layer 106 and the pixel electrode 110. Therefore, the water-repellent layer 114 is not easily stripped from the insulation layer 106 and the pixel electrode 110.

According to an embodiment, the water-repellent layer 114 may have a thickness of not more than about 100 Å. As the thickness of the water-repellent layer 114 is decreased, the electrowetting display device may be driven at a relatively low voltage.

The water-repellent layer 114 may be formed by liquid or vapor phase deposition.

For example, a silane-based self-assembled precursor may be self-assembled forming the water-repellent layer 114. According to an embodiment, the self-assembled precursor may be, e.g., perfluorodecyltrichlorosilane (FDTS), octadecyltrichlorosilane (OTS), perfluorooctyltrichlorosilane (FOTS), or octyltrimethoxysilane (OTMS).

The water-repellent layer may be formed at a temperature of not more than about 100 degrees Celsius. For example, according to an embodiment, the water-repellent layer 114 may be formed at a temperature of about 10 degrees Celsius to about 85 degrees Celsius.

Figure 2D:
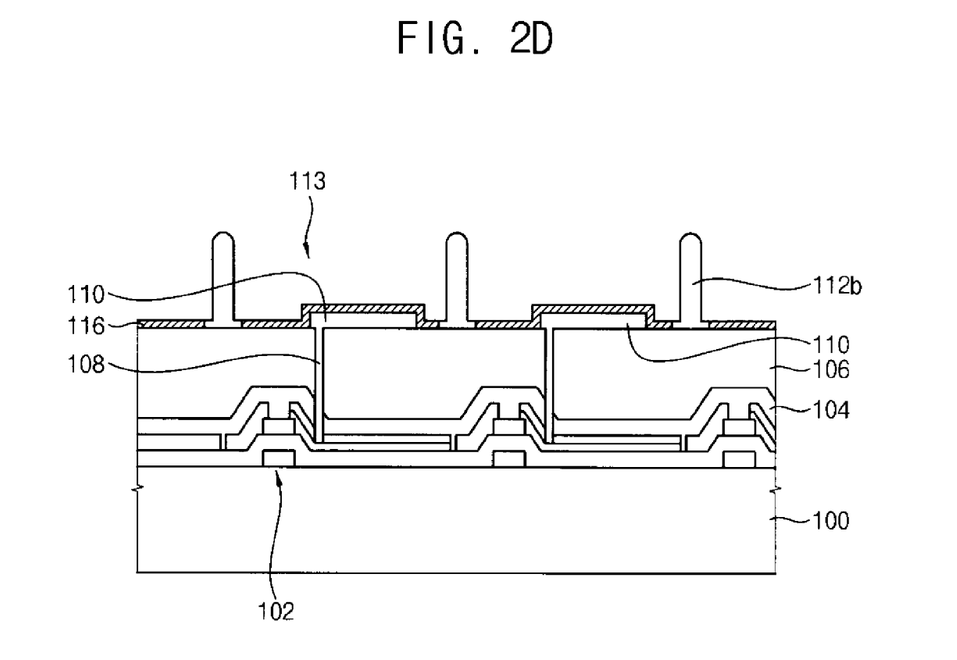

Referring to FIG. 2D, a surface portion of the preliminary partition wall pattern 112a and the second water-repellent layer 114b formed on the preliminary partition wall pattern 112a are removed forming a partition wall pattern 112b. A water-repellent pattern 116 is formed on the pixel electrode 110 and the insulation layer 106 between partition walls of the partition wall pattern 112b. According to an embodiment, t a wet-etching process may be performed, and the water-repellent pattern 116 may be formed.

Figure 4A:
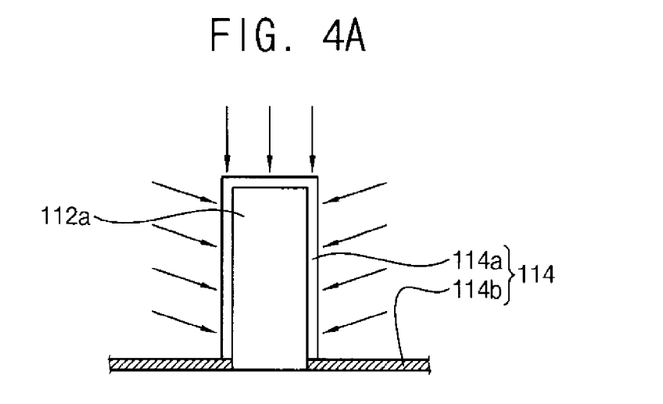
Figure 4B:
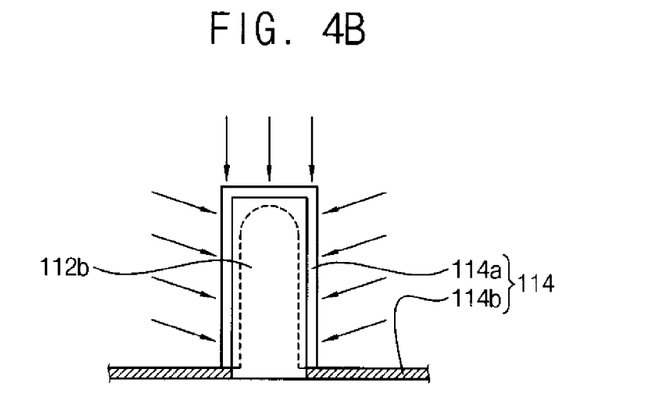
Figure 4C:
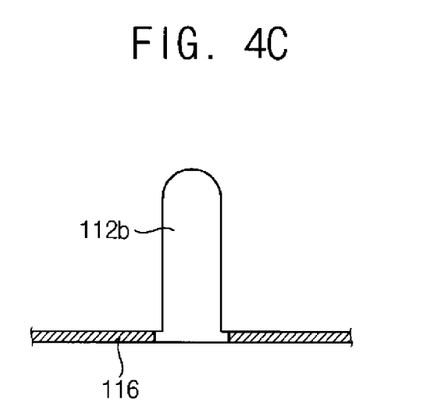

FIG. 4A to FIG. 4C are cross-sectional views illustrating a process of forming a partition wall pattern and a water-repellent pattern.

As shown in FIG. 4A, a wet-etching solution is provided, which etches the preliminary partition wall pattern 112a at a slow speed and which hardly etches the insulation layer 106 and the pixel electrode 110. For example, the wet-etching solution may have an etching selection ratio with respect to the oxide-based pixel electrode 110 and the insulation layer 106, and the wet-etching solution may selectively etch the preliminary partition wall pattern 112a. For example, according to an embodiment, the wet-etching solution may include N-methylpyrrolidone (NMP), potassium hydroxide (KOH), or tetramethylammonium hydroxide (TMAH).

A number of pin holes may be formed in the first water-repellent layer 114a, and the wet-etching solution is infiltrated into a surface of the preliminary partition wall pattern 112a through the pin holes of the first water-repellent layer 114a.

As shown in FIG. 4B, the first water-repellent layer 114a contacting the preliminary partition wall pattern 112a is removed, and a portion of the preliminary partition wall pattern 112a is removed. Since no or few pin holes are formed in the second water-repellent layer 114b formed on the pixel electrode 110 and the insulation layer 106, the etching solution is not or hardly infiltrated into the pixel electrode 110 and the insulation layer 106.

Thus, as shown in FIG. 4C, the second water-repellent layer 114b remains on the pixel electrode 110 and the insulation layer 106, and a water-repellent pattern 116 is formed.

When the etching process is performed, a side portion of the preliminary partition wall pattern 112a is partially removed and a partition wall pattern 112b different in shape from the preliminary partition wall pattern 112a is formed. The second water-repellent layer 114b having a relatively high density is formed on the pixel electrode 110 and the insulation layer 106, and no or little wet etching solution is infiltrated into a lower portion of the preliminary partition wall pattern 112a. Since a lower portion of the preliminary partition wall pattern 112a is not or hardly removed, a lower portion of the partition wall pattern 112b may be wider than an upper portion of the partition wall pattern 112b. According to an embodiment, a height of the lower portion of the partition wall pattern 112b may be substantially equal to a height of the water-repellent pattern 116. An end portion of the partition wall pattern 112b is isotropy-etched, and thus may be rounded.

The water-repellent layer 114 formed on the partition wall pattern 112b is selectively removed, and a water-repellent pattern 116 is formed on the pixel electrode 110 and the insulation layer 106 between the partition walls of the partition wall pattern 112b.

According to an embodiment, when the etching process is performed, an additional etching mask need not be used. The partition wall pattern 112b and the water-repellent pattern 116 may be formed in a simple etching process without a photolithograph process. The water-repellent pattern 116 is chemically combined with upper surfaces of the pixel electrode 110 and the insulation layer 106 by a relatively high adhesive force. The water-repellent pattern 116 may be formed to a uniform thickness.

An additional process of forming a thin-film pattern need not be performed after the water-repellent pattern 116 is formed, and the water-repellent pattern 116 may be prevented from being damaged, and foreign substances may be prevented from remaining on the water-repellent pattern 116.

Figure 2E:
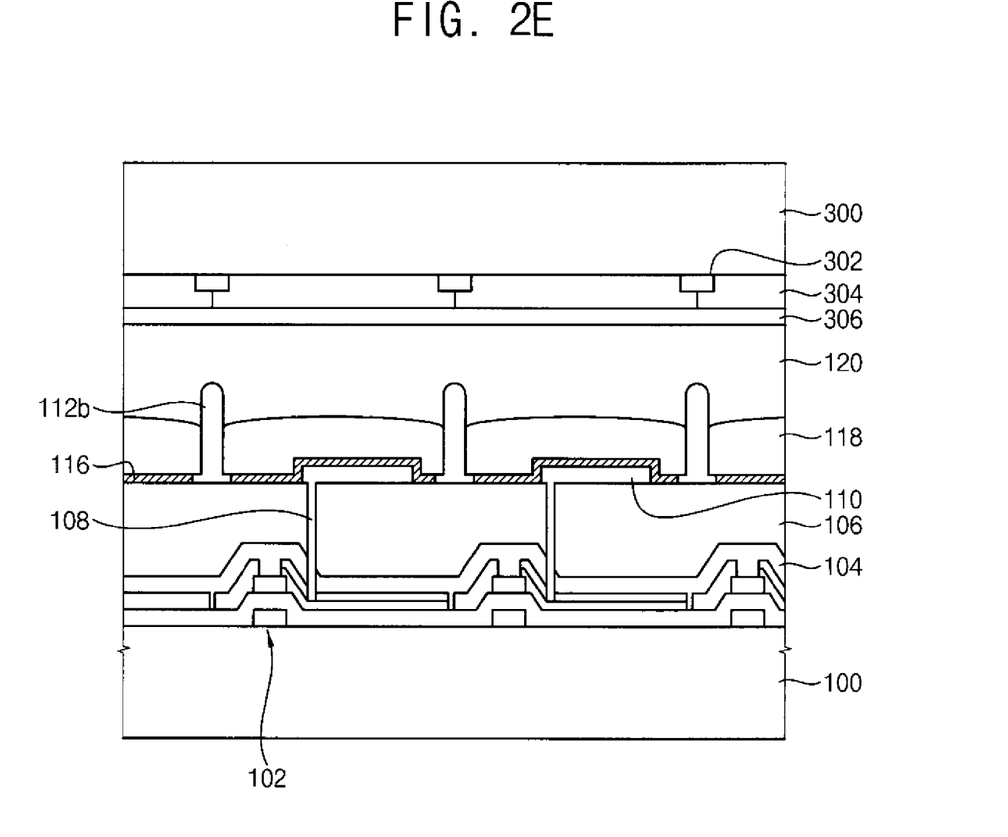

Referring to FIG. 2E, oil is sprayed in an opening portion generated by the partition wall pattern 112b, forming an oil pattern 118. According to an embodiment, the oil may be sprayed by an inkjet spray method. The oil contacts the water-repellent pattern 116. According to an embodiment, the oil pattern 118 has a black color to transmit or block light. According to an embodiment, the oil pattern 118 blocks and absorbs light incident from an external source to prevent light from being reflected.

An electrolyte layer 120 is formed on the oil pattern 118 to cover the partition wall pattern 112b. According to an embodiment, the electrolyte layer 120 may include ethylene glycol (EG). Since an affinity between the electrolyte layer 120 and the partition wall pattern 112b having a hydrophilic property is relatively great, the electrolyte layer 120 may be stably disposed on the oil pattern 118.

When the electrolyte layer 120 is formed, the oil pattern 118 is pushed toward the water-repellent pattern 116 by gravity and the oil pattern 118 contacts the upper surface of the water-repellent pattern 116. According to an embodiment, the electrolyte layer 120 may be formed by a slit coating process.

An upper substrate 300 is prepared, and then a light-blocking pattern 302, a color filter layer 304 and a common electrode 306 are formed on the upper substrate 300. According to an embodiment, the upper substrate 300 includes a glass substrate. The light-blocking pattern 302 is formed facing the partition wall pattern 112b. The color filter layer 304 includes plural color filters for transmitting different colors, respectively. Each of the color filters is formed facing the pixel electrode 110. The common electrode 306 is formed on the color filter layer 304. A common voltage is applied to the common electrode 306.

The upper substrate 300 is covered on the lower substrate 100 on which the electrolyte layer 120 is formed, and then the lower substrate 100 and the upper substrate 300 are combined with each other, thus forming an electrowetting display device.

Alternatively, oil is dropped on the lower substrate 100, the lower substrate 100 and the upper substrate 300 are combined with each other, and then electrolyte is injected between the lower substrate 100 and the upper substrate 300 to thereby form an electrowetting display device.

The partition wall pattern 112b is formed on the insulation layer 106, and an adhesive force of the partition wall pattern 112b may be increased. A water-repellent pattern 116 may be formed of, e.g., a self-assembled monolayer on the insulation layer 106 between partition walls of the partition wall pattern 112b and on the pixel electrode 110. Thus, the water-repellent pattern 116 need not be formed on a bottom surface and side surfaces of the partition wall pattern 112b, and electric characteristics of the electrowetting display device may be improved. According to an embodiment, the water-repellent pattern 116 includes a self-assembled monolayer (SAM), and the water-repellent pattern 116 is chemically combined with the insulation layer 106, which is formed of, e.g., an oxide, and the pixel electrode 110 with a relatively high adhesive force, and the water-repellent pattern 116 may be formed to a uniform thickness.

Figure 5:
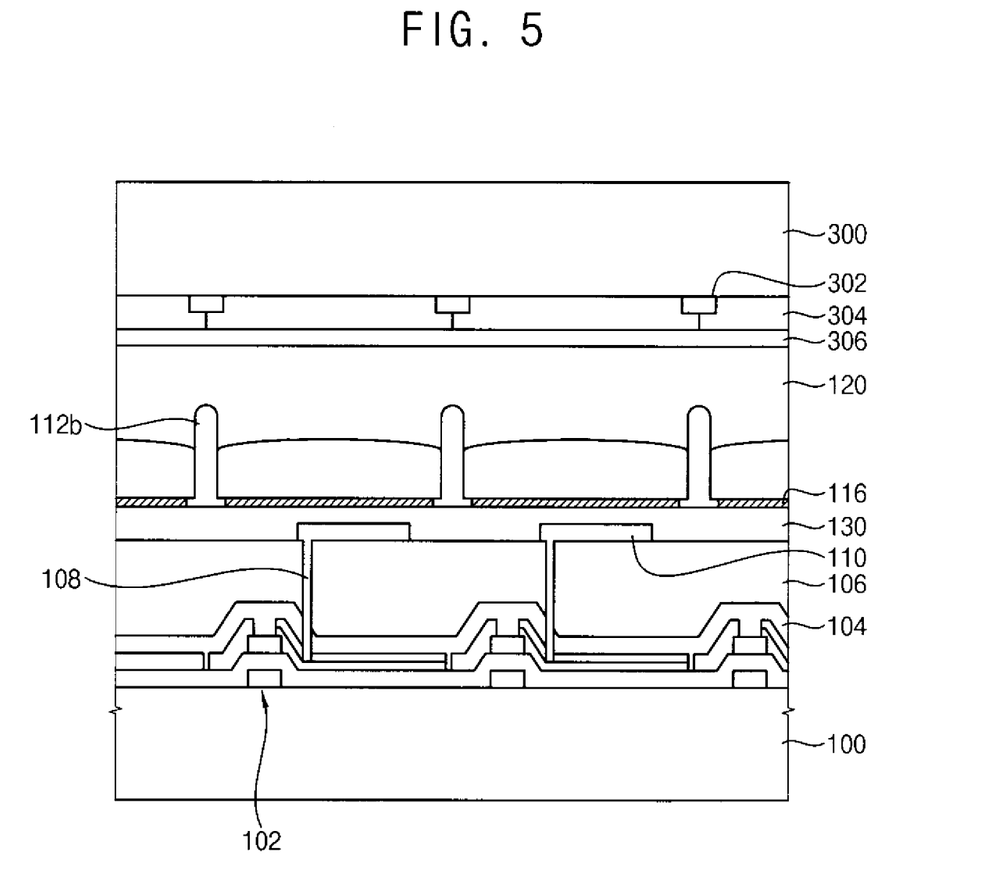
FIG. 5 is a cross-sectional view illustrating an electrowetting display device according to an exemplary embodiment of the present invention.

FIG. 5 is a cross-sectional view illustrating an electrowetting display device according to an exemplary embodiment of the present invention.

Referring to FIG. 5, the electrowetting display device includes a lower substrate 100, an upper substrate 300 and a fluid layer 118 and 120. The upper substrate 300 and members formed on the upper substrate 300 are the same or substantially the same as the upper substrate 300 and members formed on the upper substrate 300 described with reference to FIG. 1. The fluid layer 118 and 120 is the same or substantially the same as the fluid layer 118 and 120 described with reference to FIG. 1.

A thin-film transistor 102, a barrier layer 104, an insulation layer 106, a pixel electrode 110, a protection layer 130, a partition wall pattern 112b and a water-repellent pattern 116 are formed on the lower substrate 100.

The lower substrate 100 is the same or substantially the same as the lower substrate 100 described with reference to FIG. 1. According to an embodiment, a protection layer 130 is formed on the pixel electrode 110 and the insulation layer 106 to protect the pixel electrode 110.

The protection layer 130 may cover the pixel electrode 110 and a notch electrode. According to an embodiment, the protection layer 130 may include an insulation material, such as an oxide. According to an embodiment, the protection layer 130 may include a silicon oxide. The protection layer 130 may prevent the thin-film transistor 102, the pixel electrode 110 and the notch electrode from being damaged or corroded by the fluid layer 118 and 120.

The partition wall pattern 112b is disposed along an edge of the pixel electrode 110. According to an embodiment, the partition wall pattern 112b may have the same or substantially the same shape and material as the partition wall pattern 112b described in connection with FIG. 1. According to an embodiment, the partition wall pattern 112b is formed of an oxide on the protection layer 130, thereby increasing an adhesive force between the partition wall pattern 112b and the protection layer 130.

The water-repellent pattern 116 is disposed on the protection layer 130 between partition walls of the partition wall patterns 112b. According to an embodiment, the water-repellent pattern 116 may include a self-assembled monolayer (SAM) having a hydrophobic property. According to an embodiment, the self-assembled monolayer may include a material with an inner density that is varied in accordance with the surface energy of a contact surface. The self-assembled monolayer formed on the protection layer having relatively high surface energy may have a relatively high inner density, and the self-assembled monolayer formed on an upper surface of the partition wall pattern 112b having relatively low surface energy may have a relatively low inner density. Thus, on the upper surface of the protection layer, the water-repellent pattern 116 may be formed of a self-assembled monolayer having a relatively smaller number of pin holes and defects and having a relatively high inner density.

According to an embodiment, the water-repellent pattern 116 may include the same or substantially the same self-assembled monolayer as the self-assembled monolayer described in connection with FIG. 1. According to an embodiment, the water-repellent pattern 116 may have a thickness of about 5 Å to about 100 Å.

The water-repellent pattern 116 is chemically combined with the protection layer 130 which is formed of an oxide. Thus, the thickness of the water-repellent pattern 116 may be uniform. For example, according to an embodiment, a thickness deviation of the water-repellent pattern 116 may be within about 10%.

The partition wall pattern 112b having a hydrophilic property contacts the protection layer 130 formed of an oxide, and thus, a relatively high adhesive property may be provided between the partition wall pattern 112b and the protection layer 130. The water-repellent pattern 116 may strongly adhere to the protection layer 130 between partition walls of the partition wall patterns 112b. The water-repellent pattern 116 may have a thin and uniform thickness. Thus, the electrowetting display device according to an exemplary embodiment may be driven at a relatively low driving voltage and may have increased reliability.

Figure 6A:
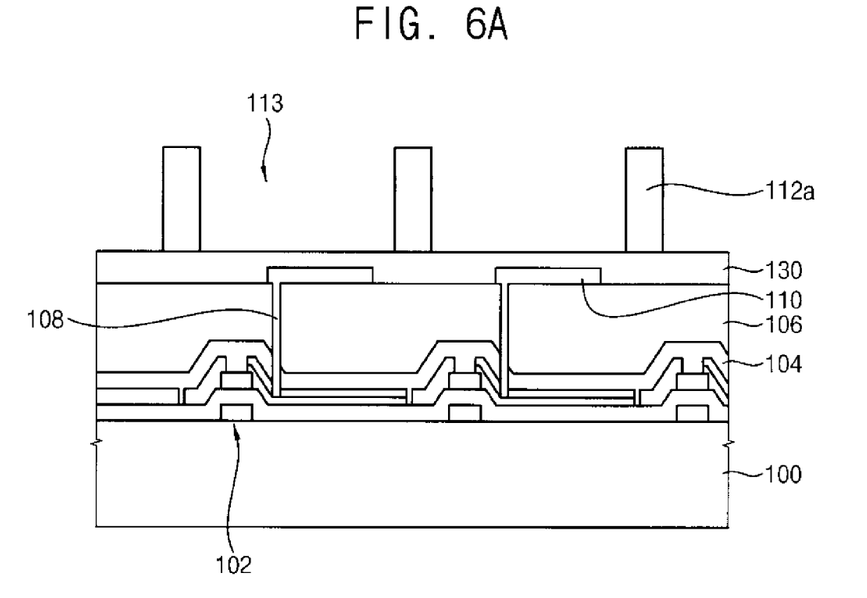
Figure 6B:
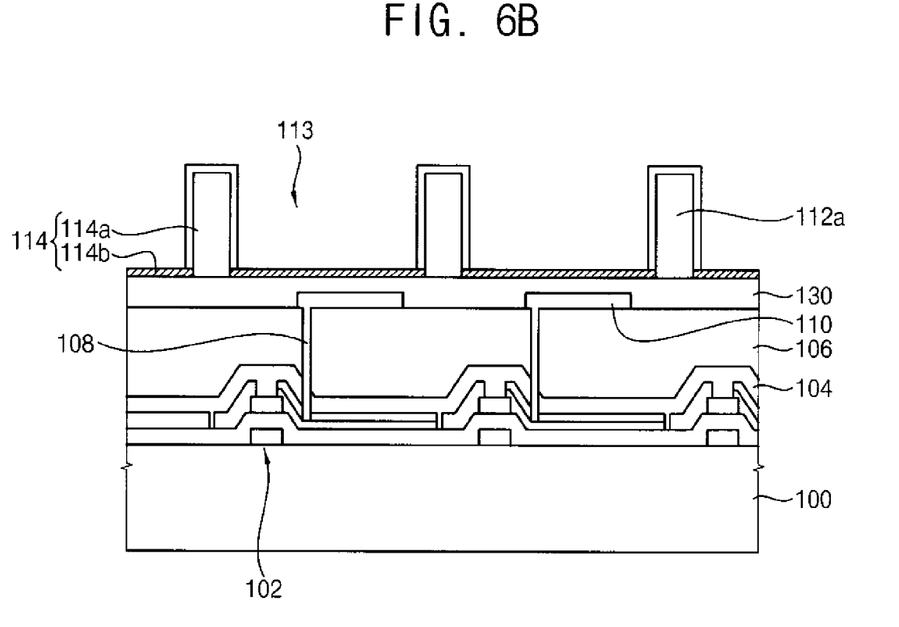
Figure 6C:
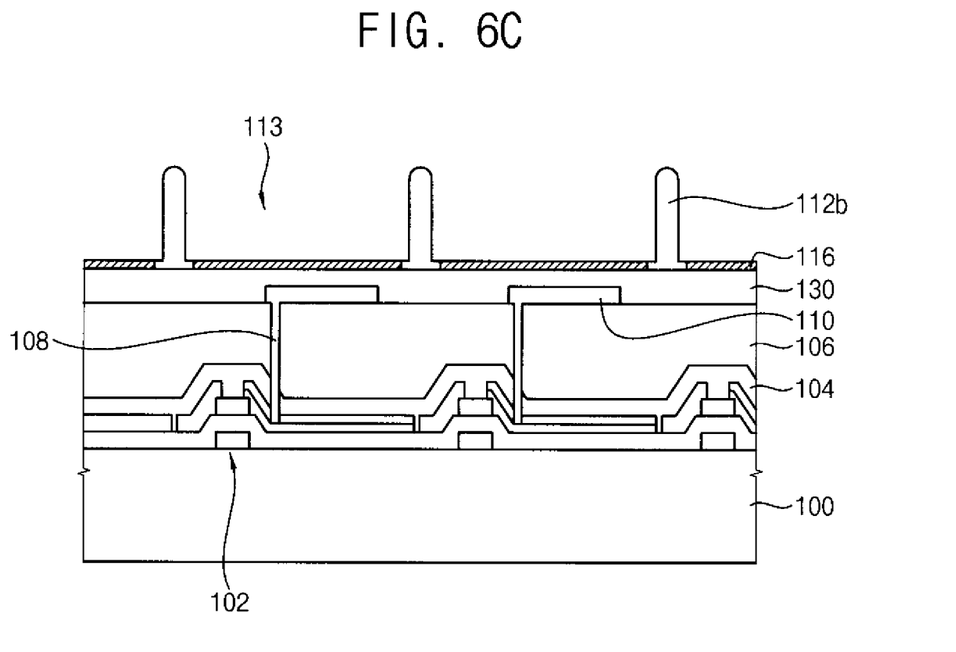

FIG. 6A to FIG. 6C are cross-sectional views illustrating a method of manufacturing a first substrate as shown in FIG. 5.

Referring to FIG. 6A, the thin-film transistor 102, the barrier layer 104, the insulation layer 106 and the pixel electrode 110 are sequentially formed on the lower substrate 100. According to an embodiment, the insulation layer 106 may include a material, such as an oxide. According to an embodiment, the pixel electrode 110 may include an oxide-based transparent electrode. For example, according to an embodiment, the insulation layer 106 may include a silicon oxide. The pixel electrode 110 may include a material, such as indium tin oxide (ITO) or indium zinc oxide (IZO).

Then, a protection layer 130 including an insulation material, e.g., an oxide is formed on the lower substrate 100 on which the pixel electrode 110 is formed. According to an embodiment, the protection layer 130 may include a silicon oxide.

The preliminary partition wall pattern 112a is formed on the protection layer 130. According to an embodiment, the preliminary partition wall pattern 112a may be formed by the same or substantially the same process as the process described in connection with FIGS. 2A and 2B. The protection layer 130 includes an insulation material, such as an oxide, and adhesive characteristics between the preliminary partition wall pattern 112a formed on the protection layer 130 and the protection layer 130 may increase. The preliminary partition wall pattern 112a is formed on the protection layer 130, and an opening portion 113 is formed between two neighboring partition walls of the preliminary partition wall pattern 112a. The protection layer 130 is exposed through the opening portion 113.

Referring to FIG. 6B, a water-repellent layer 114 is formed along a surface of the preliminary partition wall pattern 112a and the protection layer 130 exposed through the opening portion 113. The water-repellent layer 114 has a hydrophobic property that is substantially greater than a hydrophobic property of the preliminary partition wall pattern 112a.

According to an embodiment, the water-repellent layer 114 may include a self-assembled monolayer (SAM). A material of the water-repellent layer 114 and a method of forming the water-repellent layer are the same or substantially the same as those described with reference to FIG. 2C.

In an exemplary embodiment, the surface energy of the preliminary partition wall pattern 112a is substantially lower than the surface energy of the protection layer 130. The water-repellent layer 114 may include a first water-repellent layer 114a formed on a surface of the preliminary partition wall pattern 112a and a second water-repellent layer 114b formed on the insulation layer 106 and the pixel electrode 110. According to an embodiment, the first water-repellent layer 114a has a relatively great number of pin holes or defects and low density, and the second water-repellent layer 114b has a relatively small number of pin holes or defects and high density.

Referring to FIG. 6C, a surface portion of the preliminary partition wall pattern 112a is removed, and the first water-repellent layer 114a formed on the preliminary partition wall pattern 112a is removed forming a partition wall pattern 112b. A water-repellent pattern 116 is formed on the protection layer 130 between partition walls of the partition wall pattern 112b. According to an embodiment, a wet-etching process may be performed and the water-repellent pattern 116 may be formed.

According to an embodiment, a wet-etching solution is provided, which etches the preliminary partition wall pattern 112a at a slow speed and which hardly etches the protection layer 130. The wet-etching solution may have an etching selection ratio with respect to the protection layer 130, which is formed of an oxide, and the wet-etching solution may selectively etch the preliminarily partition wall pattern 112a. According to an embodiment, the wet-etching solution may be N-methylpyrrolidone (NMP), potassium hydroxide (KOH), or tetramethylammonium hydroxide (TMAH).

The wet-etching solution is provided through pin holes of the first water-repellent layer 114a formed on a surface of the preliminary partition wall pattern 112a. Thus, the first water-repellent layer 114a formed on the surface of the preliminary partition wall pattern 112a may be selectively removed forming a water-repellent pattern 116 without performing an additional photolithograph process.

An upper and side portion of the preliminary partition wall pattern 112a is removed forming a partition wall pattern 112b. Thus, a lower portion of the partition wall pattern 112b may be wider than an upper portion of the partition wall pattern 112b. An edge portion of the partition wall pattern 112b may have a rounded shape.

Then, the electrowetting display device shown in FIG. 5 is manufactured by performing the processes described with reference to FIG. 2E.

A partition wall pattern 112b is formed of an oxide on a protection layer 130, and an adhesive force between the partition wall pattern 112b and the protection layer 130 may be increased. A water-repellent pattern 116 including a self-assembled monolayer (SAM) may be formed on the protection layer 130 exposed between partition walls of the partition wall pattern 112b. The water-repellent pattern 116 need not be formed on a bottom surface and upper portion of the partition wall pattern 112b, and electric characteristics of an electrowetting display device may be improved. The water-repellent pattern 116 includes a self-assembled monolayer (SAM), and the water-repellent pattern 116 is chemically combined with the protection layer 130 under a relatively high adhesive force, and the water-repellent pattern 116 may be formed to a uniform thickness.

According to embodiments, a partition wall pattern and a water-repellent pattern may be stably formed on a lower substrate. The water-repellent pattern need not be formed on a surface of the partition wall pattern that may have hydrophilic property. Therefore, an electrowetting display device having increased reliability may be manufactured.

It will be apparent to those skilled in the art that various modifications and variations can be made in the present invention without departing from the spirit or scope of the invention.

What is claimed is:

1. A method of manufacturing an electrowetting display device, the method comprising:
    forming a preliminary partition wall pattern on a lower substrate on which a pixel electrode and an insulation layer are formed, wherein the preliminary partition wall pattern is disposed along a boundary of the pixel electrode;
    forming a water-repellent layer on the preliminary partition wall pattern, the pixel electrode, and the insulation layer, wherein the water-repellent layer comprises a self-assembled monolayer having a hydrophobic property;
    removing a portion of the preliminary partition wall pattern and the water-repellent layer formed on the preliminary partition wall pattern, and forming a partition wall pattern on the insulation layer;
    forming a water-repellent pattern on the insulation layer and the pixel electrode between partition walls of the partition wall pattern, wherein removing the portion of the preliminary partition wall pattern results in a portion of the partition wall pattern above the water-repellant pattern that is narrower than a portion of the partition wall pattern below the water-repellant pattern;
    forming a fluid layer on the lower substrate on which the water-repellent pattern is formed; and
    combining the lower substrate with an upper substrate.

2. The method of claim 1, wherein forming the preliminary partition wall pattern comprises:
    coating a photosensitive polymer having a hydrophilic property on the lower substrate;
    exposing a portion of the photosensitive polymer; and
    developing the photosensitive polymer to expose the pixel electrode and the insulation layer.

3. The method of claim 1, wherein the self-assembled monolayer is a silane-based self-assembled monolayer.

4. The method of claim 3, wherein the silane-based self-assembled monolayer includes perfluorodecyltrichlorosilane (FDTS), octadecyltrichlorosilane (OTS), perfluorooctyltrichlorosilane (FOTS), or octyltrimethoxysilane (OTMS).

5. The method of claim 1, wherein the water-repellent layer is formed by liquid or vapor phase deposition.

6. The method of claim 1, wherein the water-repellent layer has a thickness of about 5 Å to about 100 Å.

7. The method of claim 1, wherein the portion of the preliminary partition wall pattern and the water-repellent layer are removed through a wet etching process.

8. The method of claim 7, wherein a wet etching solution used in the wet etching process has an etching selection ratio with respect to the pixel electrode and the insulation layer, and wherein the wet-etching solution selectively etches the preliminary partition wall pattern.

9. The method of claim 1, wherein surface energy of the partition wall pattern is substantially lower than surface energy of the pixel electrode and the insulation layer.

10. The method of claim 1, wherein the water-repellent layer comprises:
    a first water-repellent layer formed on the preliminary partition wall pattern; and
    a second water-repellent layer formed on the pixel electrode and the insulation layer, and
    wherein the first water-repellent layer has pin holes and defects.

11. The method of claim 10, wherein forming the water-repellent pattern comprises:
    infiltrating a wet-etching solution through the pin hole and the defects of the first water-repellent layer to remove the portion of the preliminary partition wall pattern.

12. The method of claim 1, further comprising:
    forming a protection layer between the water-repellent pattern and the insulation layer.

13. The method of claim 1, wherein the pixel electrode comprises an oxide-based transparent electrode, and the insulation layer comprises a silicon oxide.

14. A method of manufacturing an electrowetting display device, the method comprising:
    forming preliminary partition walls on a lower substrate on which a pixel electrode and an insulation layer are formed, wherein the preliminary partition walls have a first width;

forming a first water-repellent layer on the preliminary partition walls;

forming a second water-repellent layer on the pixel electrode and the insulation layer;

removing the first water-repellent layer from the preliminary partition walls; and removing a portion of the preliminary partition walls above the second water-repellent layer to form partition walls, wherein the partition walls include (i) a first portion above the second water-repellent layer and (ii) a second portion below the second water-repellent layer, and wherein the first portion has a second width that is smaller than the first width.

15. The method of claim 14, wherein the first water-repellent layer comprises a self-assembled monolayer.

16. The method of claim 14, wherein the first water-repellent layer includes a greater number of pin holes and defects than the second water-repellent layer.

17. The method of claim 16, wherein removing the portion of the preliminary partition walls above the second water-repellent layer to form partition walls comprises:

providing a wet-etching solution through the pin holes and the defects of the first water-repellent layer to remove the portion of the preliminary partition walls above the second water-repellent layer.

18. The method of claim 14, wherein the first water-repellent layer has a thickness of about 5 Å to about 100 Å.

19. The method of claim 14, wherein the portion of the preliminary partition walls and the first water-repellent layer are removed through a wet etching process.

20. The method of claim 19, wherein a wet etching solution used in the wet etching process has an etching selection ratio with respect to the pixel electrode and the insulation layer, and wherein the wet etching solution selectively etches the preliminary partition walls.

* * * * *